Patented Dec. 14, 1937

2,102,448

UNITED STATES PATENT OFFICE 2,102,448

PROCESS OF PREPARING ALUMINUM ALLOYS

Henry L. Whitman, Los Angeles, Calif.

No Drawing. Original application August 26, 1936, Serial No. 98,076. Divided and this application March 13, 1937, Serial No. 130,677

1 Claim. (Cl. 75—140)

This invention relates to the method of preparing an aluminum alloy in which aluminum and certain ingredients are added which are very active in the producing of alloys. This application is a division of my application Ser. No. 98,076, filed Aug. 26, 1936.

The object of the invention is to provide a method of preparing such an alloy of superior texture for use either as a metal itself or as an alloy of a special advantage for use in other alloys.

First step or stage: To produce this aluminum alloy, first melt together in a crucible 5.31% copper, .88% nickel, 1.66% manganese. These elements are melted together because of their high melting points. They consequently very readily join together and make an alloy. This alloy can be cast into pig form and later combined with the proper percentage to make aluminum alloy, the same being united to aluminum in the molten stage.

Second step or stage: I melt in a separate crucible 88.23% aluminum. When it is thoroughly melted and fluid I add the result of the first stage, viz., copper, nickel and manganese. It is preferable to add these in the molten state, although the pig form having been previously melted and alloyed may be used but it consumes unnecessary time in melting and mixing.

Third step or stage: After the first stage, alloy has been melted in the aluminum and thoroughly combined, I add to the whole mass 2.65% of tin and .88% magnesium and thoroughly mix and combine the same together.

Fourth stage: After these metals and alloys of the first three stages have all been mixed together and thoroughly stirred, I add .39% silver, making the total of 100%.

I then stir and mix thoroughly. This metal is then cast into pig form. It pours into the pigs free from all dross or impurity and is ready for use as one of the elements in making copper, lead and tin bronzes. It is also a valuable metal alloy in itself.

The product, of course, is dominated by the aluminum and has a silvery luster when machined; the metals alloyed with the aluminum make it a very close grained metal of great strength when compared with aluminum and very resistant to corrosion.

Having thus described my invention, what I claim as new and desire to secure by Letters Patent is:

The process of preparing an aluminum alloy consisting in melting together 5.31% of copper, .88% of nickel, 1.66% of manganese; adding this when thoroughly melted to 88.23% of aluminum fused in a separate crucible, then adding to this melted mass 2.65% of tin, .88% of magnesium, stirring the same thoroughly and while in a thoroughly fluid and melted condition finally adding .39% of silver, making up the total 100%, stirring and mixing thoroughly.

HENRY L. WHITMAN.